| United States Patent [19] | [11] Patent Number: 4,576,887 |
|---|---|
| Ehrlich et al. | [45] Date of Patent: Mar. 18, 1986 |

[54] PHOTOCONDUCTIVE POLYMER COMPOSITIONS

[75] Inventors: Paul Ehrlich, Eggertsville; Wayne A. Anderson, Hamburg, both of N.Y.; En T. Kang, Singapore, Taiwan; Ansuya P. Bhatt, Salem, Mass.

[73] Assignee: The Research Foundation of State University of New York, Albany, N.Y.

[21] Appl. No.: 551,275

[22] Filed: Nov. 14, 1983

[51] Int. Cl.[4] .............................................. G03G 5/07
[52] U.S. Cl. ...................................... 430/71; 430/83; 430/900
[58] Field of Search .......................... 252/500; 526/75; 430/70, 71, 72, 83, 900

[56] References Cited

U.S. PATENT DOCUMENTS 4,334,048  6/1982  Katz et al. .............................. 526/75
4,456,548  6/1984  Lewis et al. ........................ 252/500

OTHER PUBLICATIONS

Journal of Polymer Science: Polymer Letters Ed. vol. 20, pp. 143–150 (1982).
Journal of Polymer Science: Polymer Physics Ed. vol. 18, pp. 2277–2286 (1980).

*Primary Examiner*—John L. Goodrow
*Attorney, Agent, or Firm*—Donald C. Studley; Michael L. Dunn

[57] ABSTRACT

Photoconductive organic polymers useful in the preparation of photodetectors and photoconductive devices comprise a transrich polyphenylacetylene. The photoconductive properties may be further enhanced by the addition of an electron-acceptor dopant, and sensitized to selected spectral regions by the addition of a selected dye.

11 Claims, No Drawings

PHOTOCONDUCTIVE POLYMER COMPOSITIONS

This invention was made with United States Government support under Grant DMR 79-16912 (RF 150-2329A) awarded by The National Research Foundation. The United States Government has certain rights in this invention.

BACKGROUND OF THE INVENTION

This invention relates to photoconductive organic polymeric materials and devices comprising a trans-rich polyphenylacetylene.

For a wide variety of electronic applications, it is highly desirable to utilize electrically conductive materials having photoconductive properties. A number of electrically conductive or semiconductive organic materials are known. In many instances, the conductivity of such material may be enhanced through the use of chemical doping techniques using various electron acceptor and/or electron donor dopants. However, although a number of electrically conductive organic materials are known, a substantially fewer number of such materials having photoconductive properties is known. Furthermore, the photoconductive properties of a material are not readily predictable from a knowledge of the electrical properties. Therefore, a continuing need exists for the discovery of materials having photoconductive properties for use in various photodetector and photoconductive devices, reprographic systems, light wave communication systems and the like. Devices utilizing photoconductive materials are well known in the literature and are described, for example, in Topics in Applied Physics; Optical and Infra-red Detectors, Ed. R. J. Keyes, Springer-Verlag, 1977.

One organic material known to exhibit electrical conductivity is polyphenylacetylene, a conjugated polymer that forms in both the cis- and trans- configurations and that may be doped with chemical dopants such as iodine or arsenic pentafluoride to improve the electrical conductivity thereof.

Polyphenylacetylene having molecular weights, for example, in excess of about 10,000 can be prepared by various methods, for example, by polymerization of phenylacetylene in the presence of a transition metal catalyst, such as ferric acetylacetonate-triethylaluminum catalyst. It has been found that the use of ferric acetylacetonate-triethylaluminum catalyst results in a polyphenylacetylene wherein the cis-configuration dominates. The preparation of polyphenylacetylene by polymerization using such catalysts, and discussions of some of the properties of the polymer, is disclosed in Sanford, T. J. et al; J. Polymer Science: Polymer Physics Edition, 18, 2277 (1980) and in Kang et al; J. Polymer Science, Polymer Letters Ed. 20, 143 (1982), wherein it is also disclosed that cis-polyphenylacetylene exhibits photoconductive properties.

It is also known that phenylacetylene may be polymerized in the presence of a tungsten catalyst such as tungsten carbonyl or tungsten hexachloride to form a trans-rich polyphenylacetylene. By the terms "trans-polyphenylacetylene" and trans-rich polyphenylacetylene", as used herein, is meant that the polyphenylacetylene referred to contains at least about 60 weight percent of the polyphenylacetylene in the trans-configuration. The preparation of trans-rich polyphenylacetylenes and the electrical conductivity thereof, in both the doped and undoped state, is disclosed, for example, in Kuwane et al, Polymer Journal, Vol. 12, No. 6 pp. 387-391 (1980). Thus, it is known in the literature that polyphenylacetylene is electrically conductive in both the cis- and trans-configurations. It has now been found, surprisingly, that trans-polyphenylacetylene exhibits distinctly advantageous photoconductive properties when compared with the cis-form of the same polymer.

SUMMARY OF THE INVENTION

It has now been found that trans-polyphenylacetylene is particularly useful as a photoconductive material with a photoconductive response in both visible and infrared regions of the spectrum, and further that such photoconductivity can be substantially enhanced by the application of a dopant to the polyphenylacetylene. Thus, in accordance with this invention there is provided a photoconductive device comprising as an essential active element thereof, a trans-rich polyphenylacetylene. The photoconductivity action spectra of the polymers employed in the present invention indicate photo responses in the short wavelength as well as in the long wavelength regions. The addition of an electronic acceptor dopant will enhance the photoconductivity of the polymer in both regions. Furthermore, the photoconductivity of the polyphenylacetylene polymer may be further sensitized in specific regions of the spectrum through the incorporation of appropriate dyes which will sensitize the photo response in the region of the dyes absorption bans and desensitize it elsewhere. Thus, there is further provided, in accordance with this invention, a photoconductive composition comprising a trans-rich polyphenylacetylene having incorporated therein a sensitizing dye.

Typical electron acceptor dopants that may be employed in the compositions of the present invention include for example, bromine, iodine, iodine chloride, iodine bromide, o-chloranil, 2,3-dichloro-5,6-dicyano-p-benzoquinone (DDQ), and the like. Typically, the dopants may be employed in concentrations of up to about 10 mole percent based on the phenylacetylene monomer units. However, it has been found that little or no increase in photoconductivity is achieved when doping levels of less than about 0.04% are employed. Preferably, a dopant is employed in an amount of about 0.1 to about 3 mole percent per monomer unit of phenylacetylene. The incorporation of a dopant may be conveniently carried out in solution, for example, using a chloroform solution of the polymer, adding the dopant thereto, mixing, casting the solution on a flat surface, and evaporating the solvent. In this manner, uniformly doped, amorphous films, typically from about 2 to about 10 micrometers thick, and having useful photoconductive properties can be conveniently obtained. It has been found, surprisingly, that photocurrent to dark current ratios of trans-rich polyphenylacetylene either doped or undoped may be orders of magnitude greater than the ratios for similar cis-rich compositions.

In one embodiment, the present invention relates to trans-rich polyphenylacetylene compositions, either doped or undoped, which have been sensitized to one or more selected regions of the spectrum by the incorporation therein of a dye. In general, the photosensitivity of the trans-rich polyphenylacetylene is enhanced in the spectral regions where the incorporated dye absorbs. In the region of dye absorption, the photoconductive response of the trans-polyphenylacetylene can be increased by at least one order of magnitude. Thus, for example, when dyes such as Pyronin Y or Methylene Blue, which absorb in the short wavelength region of the spectrum, are employed, the photo response of the polymer will be enhanced in the short wavelength region and will tend to be desensitized in the long wavelength region.

The following specific examples are provided to further illustrate this invention and the manner in which it may be carried out. It will be understood, however, that the specific details given in the examples have been chosen for purposes of illustration and are not to be construed as a limitation on the invention. In the examples, unless otherwise indicated, all parts and percentages are by weight and all temperatures are in degrees Celsius.

EXAMPLES I AND II

Polymer films sensitized with Methylene Blue and Pyronin Y dyes were prepared by mixing dilute chloroform solutions of polyphenylacetylene and dye and casting the mixture over $SnO_2$-coated glass slides (NESA glass) and evaporating the solvent. The polyphenylacetylene employed was a trans-rich polymer having an average molecular weight of about 80,000, prepared by polymerization of phenylacetylene in the presence of a $W(CO)_6$ catalyst in carbon tetrachloride solution under irradiation by a high pressure mercury lamp. The polymer and dye solutions were employed in strengths and proportions sufficient to yield a polymer film containing about two weight percent of dye. The thickness of the films was determined by weighting and found to be about 3 micrometers. A thin, semi-transparent layer of aluminum was vacuum deposited on the polymer film to form a sandwich-like configuration of Al/polyphenylacetylene/$SnO_2$, and electrodes attached to the aluminum and $Sn_2$ layers. A potential of $7.5 \times 10^4$ V/cm was applied across the electrodes current was measured. The polymer was then illuminated through the $SnO_2$ layer, at an intensity of about $4 \times 10^{16}$ photons/cm$^2$-sec using a 150 W xenon arc gas discharge lamp and current was measured at the same potential. The measured dark currents and photocurrents of the dye sensitized polyphenylacetylene samples is set forth in Table 1, below.

TABLE I

| Example | Dye | Dark Current (Amp/cm$^2$) | Photocurrent (Amp/cm$^2$) | Photo Current Dark Current (Ratio) |
|---|---|---|---|---|
| 1 | Pyronin Y | $1.7 \times 10^{-9}$ | $7.22 \times 10^{-7}$ | 425 |
| 2 | Methylene Blue | $1.7 \times 10^{-9}$ | $6.94 \times 10^{-7}$ | 408 |

EXAMPLES 3–7

Following a procedure similar to that set forth in Examples 1 and 2, above a series of polyphenylene compositions (PPA), doped and undoped, were prepared by mixing dilute solutions of the polyphenylacetylene and dopant, casting on the surface of an $SnO_2$ coated glass slide, and evaporating the solvent to form a film 2–4 micrometers in thickness. A thin layer of aluminum was then vacuum deposited on the polymer film to form a sandwich cell of Al/polyphenylacetylene/$SnO_2$ Electrodes were attached and radiation from xenon light source (wavelength—340 nm) was applied to the polymer through the glass slide and transparent $SnO_2$ layer. The spectral content of the light source was varied through the use of a filter to provide a red illumination having a wavelength of about 700 nm. The electric field applied to each sample was maintained at about $7.5 \times 10^4$ V/cm. Dark current and photocurrent measurements were taken at both the 340 mn and 700 mn illuminations with the results as set forth in Table II below.

TABLE II

| | | | Red Illumination at 700 nm | | White Illumination at 340 nm | |
|---|---|---|---|---|---|---|
| | | | | Photocurrent | | Photocurrent |
| Example | Polymer | Dark Current (A/cm$^2$) | Photocurrent (A/cm$^2$) | Dark current (Ratio) | Photocurrent (A/cm$^2$) | Dark current (Ratio) |
| 3 | cis-rich PPA m.w. = 12,000 | $2.5 \times 10^9$ | $3.1 \times 10^{10}$ | 0.125 | $9.1 \times 10^9$ | 3.6 |
| 4 | trans-rich PPA m.w. = 12,000 | $6.11 \times 10^9$ | $8.33 \times 10^{-8}$ | 14 | $6.67 \times 10^{-7}$ | 110 |
| 5 | trans-rich PPA m.w. = 80,000 | $4.02 \times 10^{-9}$ | $6.18 \times 10^{-7}$ | 150 | $1.5 \times 10^{-6}$ | 374 |
| 6 | trans-rich PPA 1% $I_2$ dopant m.w. = 12,000 | $2.88 \times 10^{-8}$ | $2.64 \times 10^{-6}$ | 92 | $4.75 \times 10^{-6}$ | 166 |
| 7 | trans-rich PPA 3% $I_2$ dopant m.w. = 80,000 | $2.17 \times 10^{-7}$ | $1.5 \times 10^{-5}$ | 70 | $3.3 \times 10^{-5}$ | 154 |

What is claimed is:

1. A photoconductive device comprising polyphenylacetylene as a photoconductive material thereof, at least 60 weight percent of said polyphenylacetylene being in the trans-configuration.

2. A photoconductive device according to claim 1 wherein the photoconductive material is undoped polyphenylacetylene.

3. A photoconductive device according to claim 1 wherein the photoconductive active material is polyphenylacetylene having incorporated therein an electron-acceptor dopant.

4. A photoconductive device according to claim 3 wherein the dopant is iodine.

5. A photoconductive device according to claim 1 wherein the photoconductive material is polyphenylacetylene having incorporation therein a dye.

6. A photoconductive device according to claim 5 wherein the dye is Pyronin Y.

7. A photoconductive device according to claim 5 wherein the dye is methylene blue.

8. A photoconductive composition comprising a polyphenylacetylene, at least 60 weight percent of said polyphenylacetylene being in the trans-configuration having a dye incorporated therein.

9. A photoconductive composition according to claim 8 wherein the dye is Pyronin Y.

10. A photoconductive composition according to claim 8 wherein the dye is methylene blue.

11. A photoconductive composition according to claim 8 having incorporated therein an electron-acceptor dopant.

* * * * *